C. A. MULLEN.
SAND HEATER AND DRIER.
APPLICATION FILED APR. 17, 1908.
965,214.
Patented July 26, 1910.
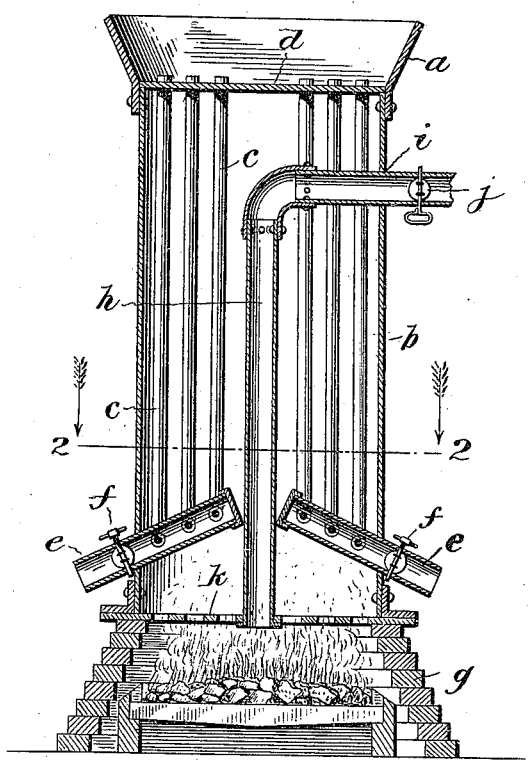
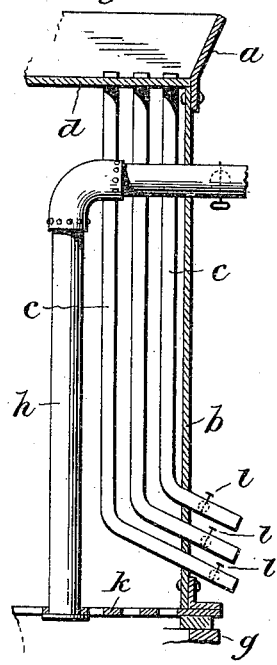
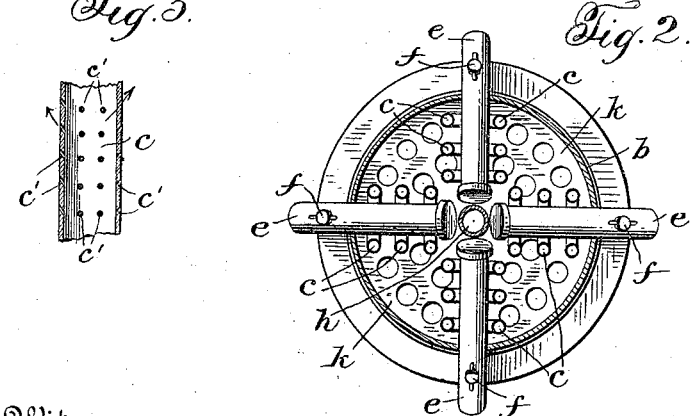
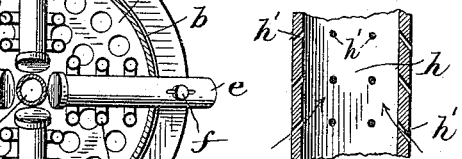
Witnesses:
Jas. E. Hutchinson
C. J. Heymur
Inventor:
Charles A. Mullen,
By J. E. Hutchinson, Attorney.

UNITED STATES PATENT OFFICE.

CHARLES A. MULLEN, OF NEW YORK, N. Y., ASSIGNOR OF ONE-HALF TO ANDREW A. MULLEN, OF NEW YORK, N. Y.

SAND HEATER AND DRIER.

965,214.  Specification of Letters Patent.  Patented July 26, 1910.

Application filed April 17, 1908. Serial No. 427,574.

*To all whom it may concern:*

Be it known that I, CHARLES A. MULLEN, citizen of the United States, residing at New York city, in the county of New York and State of New York, have invented certain new and useful Improvements in Sand Heaters and Driers, of which the following is a specification.

This invention relates to improvements in heaters and driers for sand and like granular substances, the principal object being to provide an apparatus which will effectually remove the moisture from and sufficiently heat the sand by a continuous process for its utilization in the manufacture of asphalt pavements.

A further object of the invention is the provision of an apparatus which will be simple in construction, and will materially reduce the cost of the heating and drying of granular substances over the present type now in use.

A still further object of the invention is the provision of such an apparatus that will effectually prevent any fine particles of sand passing out with the blast as in the present method, and also the eliminating of the dust nuisance so much complained of around asphalt plants.

With these and other objects in view, the invention consists in certain novel details of construction and combinations and arrangement of parts, all as will be now described and the particular features of novelty pointed out in the appended claims.

In the drawings:—Figure 1 is a vertical section through an apparatus embodying my present improvements. Fig. 2 is a cross sectional view thereof taken on the line 2—2 of Fig. 1. Fig. 3 is a detail view of a modified form of heating and drying tube, the same showing perforations therein for carrying off the moisture. Fig. 4 is a detail view of a modified form of smoke flue, also showing perforations therein, and Fig. 5 is a vertical section through an apparatus embodying a modification of the invention.

In carrying this invention into practice I preferably make use of a bin or hopper, into which the sand is dumped in bulk and from which it is drawn through the heating and drying mechanism by a continuous process, although provision is made for regulating the rapidity with which the sand travels through the heating and drying apparatus, thereby adapting the apparatus for operation upon sand containing various amounts of moisture. As shown, the hopper is in the form of a cylindrical casing, preferably open at the top and into which the sand may be dumped or shoveled, such material being allowed to gravitate down through the drying chamber and to be discharged from the bottom thereof in any desired or preferred manner.

The hopper is indicated at $a$, and is mounted upon an inclosed casing $b$ which constitutes the hot-air distributing chamber of my apparatus. The hopper is attached to said hot-air chamber in any preferred manner, and may, if desired, be formed as an integral part with said chamber or casing.

Arranged within the chamber $b$ are a plurality of vertical tubes $c$ for receiving the material from the hopper $a$, said tubes being connected to the top $d$ of said hot-air chamber which forms the bottom of the hopper. The tubes enter within the hopper and are adapted to receive the material therefrom, and convey the same by gravity to suitable retaining and discharging pipes or chutes $e$, from which the material is allowed to be discharged for use as may be desired. The discharge chutes or pipes which are inclined downwardly, are arranged within the hot-air chamber, and extend out through the sides of said chamber or casing so as to discharge the material in a dry and heated state and at a place where it can be readily obtained for the use desired. Suitable valves as shown at $f$ are arranged within the discharge pipes for the purpose of regulating the discharge of the sand from the drying and heating apparatus.

In the drawings four of the retaining and discharge pipes are shown, although it is to be understood that any number of the said pipes may be used, and it is to be further noted that the vertical heating tubes communicate with the discharge pipes through the sides thereof, three of said vertical tubes being shown in the present instance as entering each discharge pipe on each side thereof.

With a view to supplying heated air to the chamber or casing $b$ for the purpose of carrying off the moisture from the sand contained within the vertical heating and drying tubes, I preferably arrange said chamber or casing $b$ above a suitable furnace $g$. A smoke or flue $h$ leading from said furnace is centrally arranged within said chamber, and is adapted to carry off the products of combustion, the flue passing through the side of the chamber at a point indicated at $i$. A suitable damper $j$ is also provided and is arranged in that portion of the flue extending outside of the chamber, so that it may be easily operated to regulate the fire.

Arranged directly above the furnace is a perforated crowning plate $k$, the purpose of which being to distribute the hot air equally between the vertical tubes, and also to prevent the fire from acting directly upon the tubes and thereby destroying or burning them out.

It is to be understood from the foregoing description that, the heating chamber or casing being open only at the bottom where it communicates directly with the fire, the air in said chamber becomes heated to a very high degree thus heating the vertical tubes and effectually driving off all moisture from the sand or other material contained in said tubes. As the vertical tubes are comparatively small in diameter it will be readily understood that the material contained therein will be heated and dried very quickly, and as the retaining and discharging pipes or chutes are of somewhat larger diameter, the same will allow for a considerable amount of the material to be held therein directly above the fire, and permit the material to be quickly discharged therefrom when desired.

In some instances it may be found necessary to provide suitable small perforations in the vertical heating and drying tubes for carrying off the moisture. These perforations are indicated at $c'$, in Fig. 3 and are arranged in said heating and drying tubes as inclined upwardly from the inside of the tubes to the outside thereof, so as to prevent any escape of the sand along with the moisture. It may also be desirable to perforate the smoke flue $h$ so as to create a slight draft in the heating chamber or casing, and thus carry off the moisture contained therein. Such perforated flue is shown in Fig. 4, and the perforations as indicated at $h'$ are inclined upwardly from the outside of said flue to the inside thereof.

In the modification of my invention as illustrated in Fig. 5 of the drawings, it is to be noted that all of the vertical tubes for receiving the material to be heated and dried, are extended out through the sides of the heating chamber so that the material contained in each tube will be discharged directly therefrom, instead of discharging into the inclined pipes or chutes as in the apparatus shown in Figs. 1 and 2. Each of the tubes is provided as shown at $l$ with a valve for regulating the discharge of the material from said tubes.

Having described my invention, what I claim as new, and desire to secure by Letters Patent, is:—

1. A sand drying and heating apparatus comprising a furnace, an inclosed hot-air chamber or casing arranged directly above the furnace, a plurality of heating tubes within said chamber for receiving the material to be heated and dried, a perforated crown-plate located above the furnace for distributing the hot-air equally between said tubes, and a smoke flue supported by said crown-plate.

2. A sand drying and heating apparatus comprising a hot-air chamber or casing, a hopper arranged above said chamber for receiving the material to be dried and heated, a plurality of vertically disposed heating tubes within said chamber and having communication with said hopper for receiving the material therefrom, and inclined discharge pipes leading from said vertical tubes for discharging the material outside the heating chamber.

3. A sand drying and heating apparatus comprising a hot-air chamber or casing, a hopper arranged above said chamber for receiving the material to be dried and heated, a plurality of vertically disposed heating tubes within said chamber and having communication with said hopper for receiving the material therefrom, and inclined discharge pipes into which said vertical tubes empty and from which the material may be discharged in a dry and heated state.

4. A sand drying and heating apparatus comprising a hot-air chamber or casing, a hopper arranged adjacent said chamber for receiving the material to be dried and heated, a plurality of vertical tubes within the chamber and having communication with said hopper for receiving the material therefrom, discharge outlets at the bottoms of said tubes, a furnace arranged below the hot-air chamber and having communication therewith for heating the same, and a smoke flue leading from the furnace and passing centrally through the hot-air chamber.

5. A sand drying and heating apparatus comprising a hot-air chamber or casing, a hopper arranged adjacent said chamber for receiving the material to be dried, a plurality of tubes of comparatively small diameter arranged in said chamber and having communication with the hopper for receiving the material therefrom, and discharge pipes or chutes of larger diameter than the heating tubes into which said tubes empty and from which the material may be discharged in a dry and heated state.

6. A sand drying and heating apparatus comprising an inclosed heating chamber or casing, a plurality of heating tubes within said chamber for receiving the material to be heated and dried, and inclined discharge pipes leading from said tubes for discharging the material outside the heating chamber.

7. A sand drying and heating apparatus comprising a hot-air chamber or casing, a hopper arranged adjacent said casing or chamber for receiving the material to be dried and heated, a plurality of perforated tubes within said chamber and having communication with the hopper for receiving the material therefrom, discharge outlets at the bottoms of said tubes, a furnace arranged below the hot-air chamber and having communication therewith for heating the same, and a perforated smoke flue leading from the furnace and passing centrally through the hot-air chamber.

8. A sand drying and heating apparatus comprising a heating chamber or casing, a plurality of perforated heating tubes within said chamber for receiving the material to be heated and dried, a furnace arranged below the chamber and having communication therewith for heating the same, and a perforated smoke flue leading from the furnace and passing through the heating chamber.

9. A sand drying and heating apparatus comprising a heating chamber or casing, a plurality of perforated heating tubes within said chamber for receiving the material to be heated and dried, the perforations of the tubes being inclined upwardly from the inside of said tubes to the outside thereof, a furnace arranged below the chamber and having communication therewith for heating the same, and a perforated smoke flue leading from the furnace and passing through the heating chamber, the perforations in said flue being inclined upwardly from the outside of said flue toward the inside thereof.

In testimony whereof I affix my signature in presence of two witnesses.

CHARLES A. MULLEN.

Witnesses:
    CLARA S. MULLEN,
    JANE A. MULLEN.